United States Patent [19]
Varadharajan et al.

[11] Patent Number: 5,887,063
[45] Date of Patent: *Mar. 23, 1999

[54] COMMUNICATION SYSTEM FOR PORTABLE APPLIANCES

[75] Inventors: Vijay Varadharajan, Oatlands, Australia; David George Dack, Atworth, England

[73] Assignee: Hewlett-Packard Company, Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 688,007

[22] Filed: Jul. 29, 1996

[30] Foreign Application Priority Data

Jul. 28, 1995 [EP] European Pat. Off. ............ 95305282.6

[51] Int. Cl.$^6$ ...................................................... H04K 1/00
[52] U.S. Cl. ............................................................ 380/21
[58] Field of Search ................................................ 380/21

[56] References Cited

U.S. PATENT DOCUMENTS

| | | | |
|---|---|---|---|
| 4,575,621 | 3/1986 | Dreifus | 235/380 |
| 5,131,038 | 7/1992 | Puhl et al. | 380/23 |
| 5,202,922 | 4/1993 | Iijima | 380/45 |
| 5,375,140 | 12/1994 | Bustamante et al. | 380/34 |
| 5,623,546 | 4/1997 | Hardy et al. | 380/4 |
| 5,661,802 | 8/1997 | Nilssen | 380/20 |
| 5,715,390 | 2/1998 | Hoffman et al. | 395/188.01 |

FOREIGN PATENT DOCUMENTS

87/05175  8/1987  European Pat. Off. .

OTHER PUBLICATIONS

*IBM Technical Disclosure Bulletin*, vol. 29, No. 9, Feb. 1987 New York US, pp. 3949–3950.

*Machine Design*, vol. 61 No. 2, Jan. 26, 1989 Clevland Us, pp. 42 XP 000052605 "Proximity Tags Converse with Nearby Computer".

*Primary Examiner*—David Cain

[57] ABSTRACT

A portable device 12 is capable of communicating with a host device 10 remotely, via a communications network 22 which may be prone to interception, and directly (e.g. via an I.R. Link 24, 40), when the devices are in close physical proximity and when the risk of interception is minimal. The host device 10 and the portable device 12 update a shared security key or the like when they communicate directly and this key is used to authenticate the portable device 12 and/or encrypt the communication when the portable device 12 attempts to communicate remotely.

21 Claims, 2 Drawing Sheets

COMMUNICATION SYSTEM FOR PORTABLE APPLIANCES

FIELD OF THE INVENTION

This invention relates to a communication system for use with a host device and a portable device (such as e.g. a host computer and a portable computer) to allow authentication of the identity of the portable device and/or to protect communications between the host device and the portable device. In particular, but not exclusively, the invention relates to a system which allows authentication of the identity of the portable device, or secure communications, where the intrinsic security of the communications network between the portable device and the host device cannot guarantee secure communications, for example where communications are via the plain old telephone system (POTS), cellular telephone networks, or other radio links.

BACKGROUND OF THE INVENTION

There are many situations where it is desirable to be able to authenticate the identity of a remote device before allowing communications between the remote device and the host device, so that only authorized users may gain access to or manipulate data stored on the host device or transfer data between the host and portable devices. Often, the authentication of the identity of the user may be of equal or greater importance than protecting communications against electronic eavesdropping.

The increasing use of portable computing appliances means that a user may store and work on data files on a fixed desktop base appliance at his workstation on site, and take a personal computing appliance such as a portable or palm top computer with him for use off-site. Data may be transferred between the desktop appliance and the personal computer appliance either by a close range infrared (I.R.) or other optical link, or a cable when the two are in close proximity, or via a modem link when the user has the personal computing appliance with him off site. Although allowing remote access provides greater flexibility, an unauthorized user may gain access by emulating an authorized user. The use of passwords provides a basic level of security, but this is not adequate for many situations as they may be intercepted or reverse-engineered (especially since they tend to be only a few characters long and changed infrequently).

There are two common forms of encryption methods. In a public key system, a user has a "public" key which he makes available to those who wish to send him encrypted messages, and a unique "private" key which he keeps secret and uses to decrypt messages encrypted using the public key. An important feature of this method is that it can be used where the sender and receiver never meet, but the method does require a trusted third party repository to produce the public/private key pair, securely to transfer the key pair to the user, and to oversee the system. Thus the system would be cumbersome and expensive for widespread general use.

In a secret key system there is just one key involved in encrypting and decrypting a communication, which is held by both the sender and the receiver. This avoids the need for a third party repository, but it still means that elaborate precautions must usually be taken when supplying the secret key to the sender and receiver, for example a trusted intermediary travelling between the two, and again this is cumbersome and impractical for general widespread use.

Accordingly we have identified a need for a security system for a host device and a portable device which provides enhanced security when the two communicate via a non-secure communication network which is suited for widespread use and which does not require elaborate arrangements or trusted intermediaries for distributing or exchanging keys.

U.S. Pat. No. 5,202,922 discloses an encryption scheme for cashless transactions between a "smart" card, which is read by a remote point of sale terminal, and the host computer of the financial institution. The scheme is designed for remote communication only and does not envisage periodic direct communication between the smart card and the host computer. At the beginning of each session, both the smart card and the host computer have the same security key which remains the same for several sessions. For every session, two session keys are generated at separate stages by the host computer and used to encrypt communications and update the financial data on the "smart" card and the host computer in accordance with the financial transaction entered at the point of sale terminal.

We have also identified many other situations where the portable device and the host device are in close proximity from time to time but often communicate remotely via a nonsecure communication network and where the authentication of the identity of a user and/or the security of communications are important. For example, a business or domestic telephone user may have a fixed normal phone and a cellular phone, and the user may wish to encrypt or scramble communications to prevent electronic eavesdropping.

SUMMARY OF THE INVENTION

According to one aspect of this invention, there is provided a communication system, including:

a host device and a portable device capable of communicating remotely, via a communication medium, direct communication means for providing relatively secure and/or direct communications between said host device and said portable device, key update means for initiating the sharing of a security key or code data between said host device and said portable device, for controlling or encrypting subsequent remote communications between said devices, and activation means responsive to the presence of said portable device to cause said key update means to initiate sharing of said security key or code data via said direct communication means.

The described embodiments of this invention provide a very simple means of obtaining a high degree of security, secrecy and integrity between an authorized portable use and a host device and also against unauthorized access to that host by third party machines.

Unlike password schemes where a short password a few characters long remains the same for long periods, thus leaving the host device open to attack form other machines, the described embodiments incorporate a secret key which is changed very frequently and which can be very long since it does not have to be remembered by the user, thus offering substantial extra protection.

The key update means may be activated manually. The activation means may also be responsive to operation of said direct communication means.

Where said direct communication means comprises an I.R. communication link, said activation means may comprise means for detecting establishment of said I.R. communication link.

Alternatively, where said direct communication means comprises a cable or wire link connectable between said host device and said portable device, said activation means may comprise means for detecting when said cable or wire link is connected between said host device and said portable device.

Still further, where said portable device is provided with a cradle or other support means adjacent or associated with said host device, said activation means may comprise means for detecting when said portable device is in or on or docked with said cradle or other support means.

In another embodiment, where said portable device includes a rechargeable battery and said system includes adjacent or associated with said host device electrical charging means for charging said battery, said activation means may comprise means for detecting current flow through said charging means.

The host device preferably includes means for identifying a request for remote access via said communication medium from a portable device and allowing access only on receipt from the portable appliance of said security key or code data or other data authenticating the identity thereof.

Advantageously, said portable device and said host device include encryption means for encrypting and decrypting data communicated between said devices, and the key for said encryption means may comprise said security key or code data.

In another aspect, this invention provides a method of authenticating a remote device in a communication system comprising first and second devices capable of communicating remotely via a communication medium or locally via a local or direct communication link, which method comprises determining whether said first and second devices are in the same vicinity, and initiating sharing of a security key or code data between said devices via said local communication link when said first and second devices are in the same vicinity, whereby the identity of at least one of said devices may be authenticated in subsequent remote communications via said communication medium.

In a further aspect, this invention provides a method of encrypting data in a communications system comprising first and second devices capable of communicating remotely via a communication medium or locally via a local or direct communication link, which method comprises determining whether said first and second devices are in the same vicinity, and initiating sharing of a security key or code data between said devices via said local communication link when said first and second devices are in the same vicinity, whereby subsequent remote communications via said communication medium may be encrypted using said security key or code data.

Whilst the invention has been defined above, it extends to any inventive combination of features set out in the following description.

BRIEF DESCRIPTION OF THE DRAWINGS

The invention may be performed in various ways and, by way of example only, two embodiments thereof will now be described in detail, reference being made to the accompanying drawings, in which.

Figure 1:
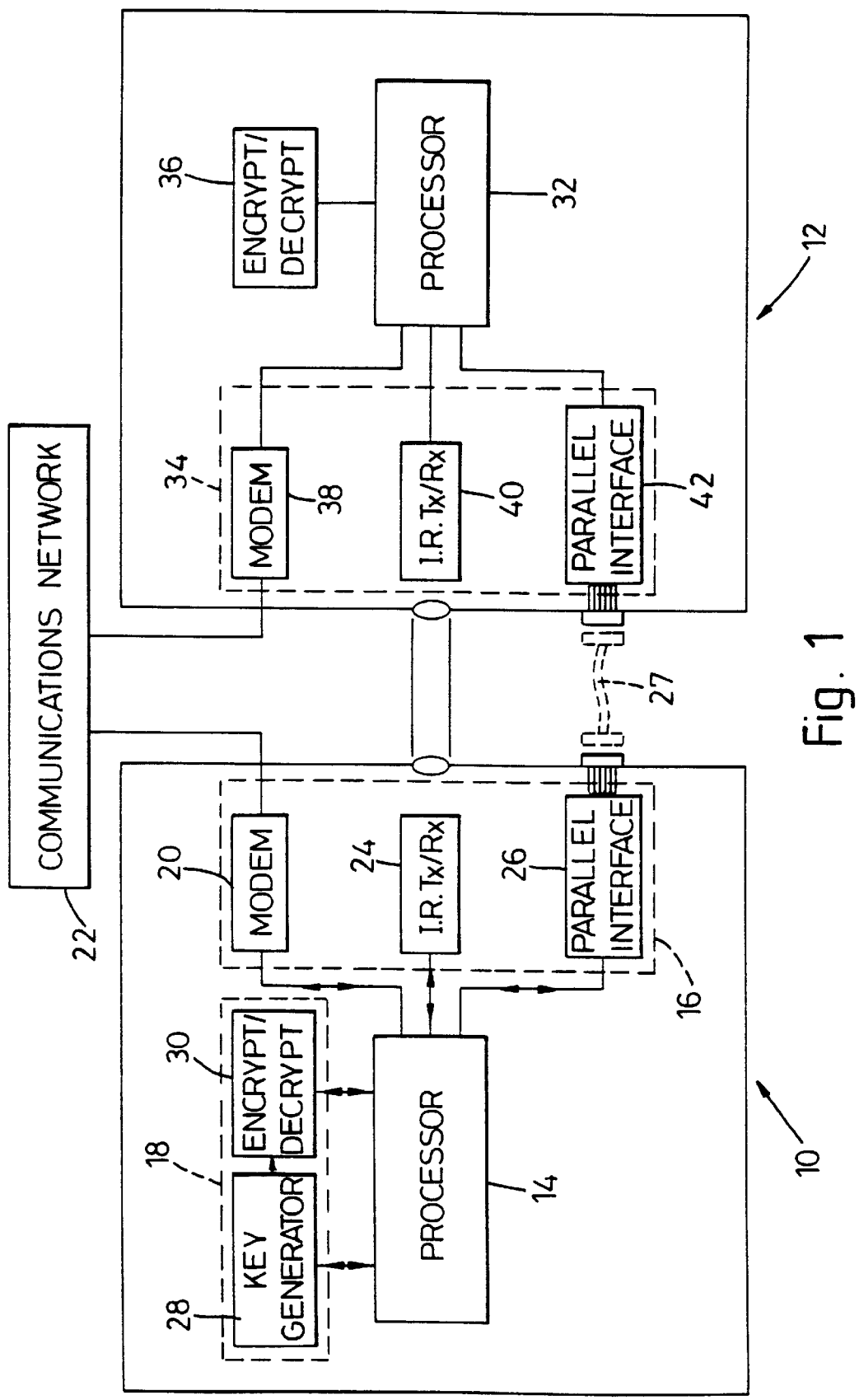
FIG. 1 is a block diagram of a communication system in accordance with a preferred embodiment of the invention.

Referring initially to FIG. 1, in the described embodiments, a host device 10 and a portable device 12 are capable of communicating both remotely, e.g. via a modem link, and directly, when the host and portable device are docked or otherwise locally associated. In practice, whilst communicating remotely is prone to interception and thus is relatively insecure, the risk of security compromise when communicating directly is nil or relatively low. In these embodiments, the portable device and host device periodically exchange a security key via the direct communication link, and the key is then used to control or encrypt subsequent remote communications.

The very first key may be input into the host device and the portable device by any of a variety of ways known to those skilled in the art. For example both the host and portable device may have the same standard, relatively insecure code programmed at the outset. The user will be instructed to ensure that a key exchange is carried out as soon as possible, and before connecting the host device to a public communications network. The first key exchange will then provide a secure key.

The host device 10 comprises a processor 14 which here controls operation of the device 10 and also implements the security system. The processor 14 controls a communications module 16, and an encryption/decryption module 18. The communications module 16 comprises a modem 20 for connection to a communications network 22 such as the POTS network or a cellular phone network, to allow remote communication, an I.R. transmitter/receiver unit 24 for direct or local communication with the portable device 12, or a parallel or direct interface 26 for cable or wire connection to the portable device 12 by a cable link 27, shown in dotted lines.

The encryption/decryption module 18 comprises a key generating device 28 for randomly or pseudo-randomly generating a security key or password typically of several thousand characters long, and an encryption/decryption device 30 for encrypting and decrypting communications with the portable device 12, and for implementing a challenge/response routine for authenticating the identity of a portable device 12 attempting to gain access remotely via the communications network 22.

The portable device 12 comprises a processor 32 which controls a communication device 38 and an encryption/decryption module 36 similar to those of the host device. The communication module 34 has a modem 38, an infrared (I.R.), i.e. optical, transmitter receiver unit 40 and a parallel or direct interface 42. The encryption/decryption device 38 is operable to encrypt and decrypt communications with the host device 10 and to take part in a challenge/response routine with the host device, to authenticate the identity of the user.

Figure 2:
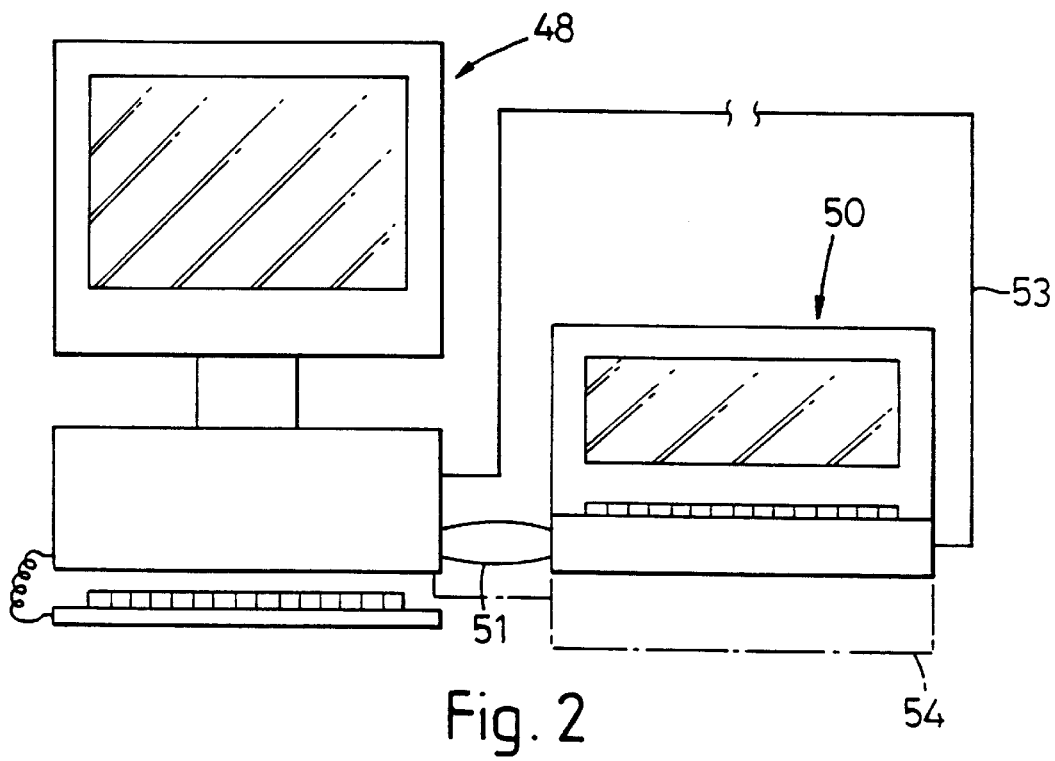
FIG. 2 is a schematic view of a first preferred embodiment of the invention as applied to a host computer and a portable computer.

Referring to FIG. 2 in conjunction with FIG. 1, the first embodiment incorporates the security system to enhance communication security between a host device 10 in the form of a desk top computer 48 and a portable device 12 in the form of a portable computer 50. The portable computer 50 may communicate with the desk top computer locally via an I.R. link 51, or remotely via a modem link indicated generally at 53.

Each time the portable computer 50 is in local or direct communication with the desk top computer 48, this is detected by the processor 14 of the desk top computer 48 and the identity of the portable computer 50 is authenticated by the desk top computer 48 by a suitable test such as a challenge/response routine as outlined below. If the portable computer 50 fails this test, the desk top computer 48 immediately terminates communications. If the portable computer 50 passes the test, the desk top computer initiates a key update routine. The key generating device 28 generates a fresh security key which is stored in the encryption/decryption unit 30 of the host device 10 and transmitted via the local I.R. link to be stored in the encryption/decryption unit 38 of the portable device 12. The security key may be transmitted in clear, or, for greater security, it may be encrypted using the previous security key. The processor of the desk top computer 48 is programmed to allow initiation of the key update routine only when the computers are in direct communication, and when the shared key matches; it does not allow a key update via the modem link. Detection of the proximity of the portable computer 50 may be achieved in various ways. The processor 14 of the desk top computer 48 may monitor the output of the I.R. transmitter/receiver unit 24 and instigate a key update routine once it has identified the portable computer in a hand shake sequence. Instead, the desk top computer 48 may detect when the portable computer is connected to it via a cable 27 and the parallel interface 26. Alternatively, there may be a cradle 54 (shown in dotted lines) into which the portable computer 50 is placed or docked for storage at the workstation, and there may be a switch or other sensor on the cradle 54 which signals the presence of the portable computer 50 to the desk top computer 48. There may be a charger for the portable computer 50 at the workstation, and a detector may determine the presence of the portable computer 50 by monitoring DC flow to the battery of the portable computer. Alternatively, the key update routine may be implemented manually.

During a subsequent remote communication exchange via the modem link 53, the desk top computer 48 issues a random challenge to the portable computer 50. The portable computer 50 calculates a response as a function of the challenge and the current security key and transmits this to the desk top computer 48. The desk top computer checks the response and if it corresponds correctly to the challenge, allows to session to continue.

The above scheme prevents an unauthorized remote user with a machine without the current security key from engaging in a session with the desk top computer. This provides an important level of defence to reduce the risk of unauthorized access. The embodiment also allows remote communications to be encrypted between the portable computer 50 and the desk top computer 48. Here, having authenticated the portable computer 50 by means of the challenge/response routine, the computers encrypt and decrypt the messages exchanged using the current security key. The level of security provided by the encryption depends on the number of characters in the security key. Where the number of characters is greater than the total number of characters to be sent between key exchanges then total security may be achieved.

In addition to providing security for the communications, several other protocol features or checks can be incorporated further to enhance the security of the system, such as non-repudiation, and digital signature.

To achieve a measure of security against the denial that a message was sent, a trusted host could keep an audit file of transactions showing that when a message was received it could only have originated from a portable computer which shared the then current, secret key.

Similarly, the secret key could be used by the portable user to "sign" messages since no other portable would possess that secret key at that time.

Figure 3:
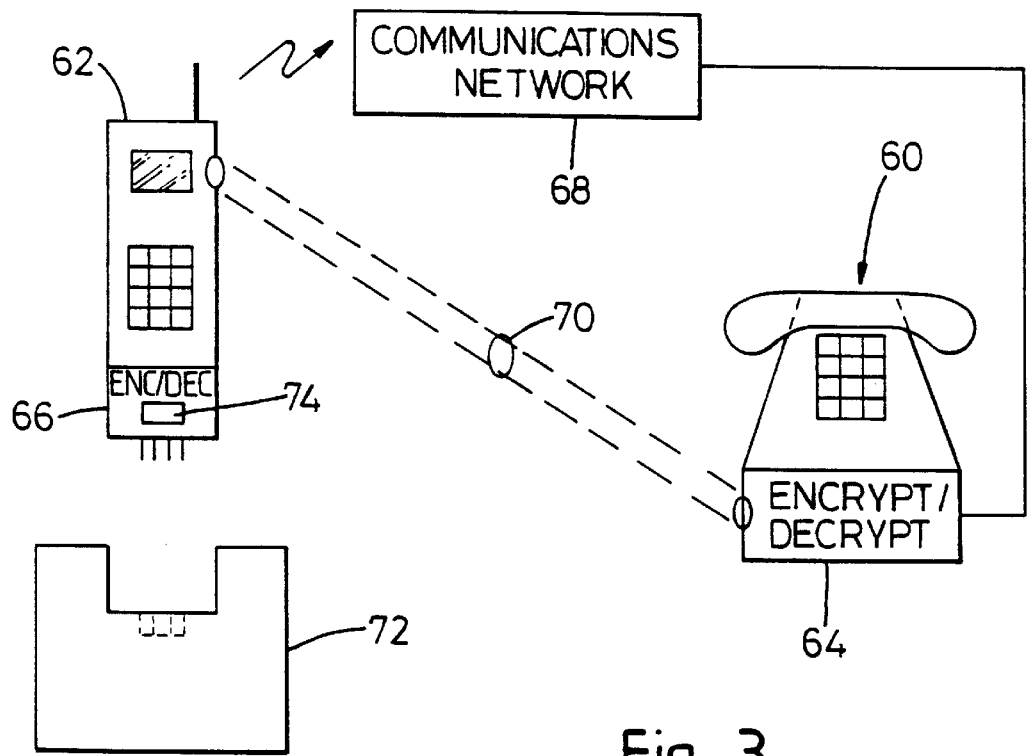
FIG. 3 is a schematic view of a second preferred embodiment of the invention, as applied to a normal phone and a cellular phone.

Referring to the second embodiment shown in FIG. 3, a fixed normal phone 60 and a cellular phone 62 communicate digitally and include encryption and decryption units 64, 66 respectively for encrypting and decrypting the calls. The normal phone and the cellular telephone can communicate either by the cellular/public telephone network or, when the two are in close proximity, by a local I.R. close range narrow beam data link. In this instance proximity is determined using a detector 74 to detect D.C. flow to the battery of the cellular phone 62 when the cellular phone 62 is in a charging cradle 72. Each time the cellular phone 62 is returned to the cradle 72, the cellular phone 62 instructs the encryption/decryption unit 64 of the fixed phone 60 via the I.R. link 70 to initiate a key update routine. As in the previous embodiment the fresh key is generated and stored at the fixed phone unit and transmitted via the local I.R. link 70 to the cellular phone. In normal use, communications between the cellular phone 62 and fixed phone via the cellular/phone network are encrypted/decrypted using the current security key.

We claim:

1. A communication system, including:

a host device and a portable device capable of remote communications via a communication medium, using a previously-established security key, direct communication means for providing relatively secure and/or direct communications between said host device and said portable device, key update means for initiating storage of duplicate copies of a fresh security key in both said host device and said portable device, for use instead of said previously-established security key for control of or encryption for subsequent remote communications between said devices, and activation means responsive to the presence of said portable device to cause said key update means to initiate transfer said fresh security key via said direct communication means.

2. A communication system according to claim 1, including means for activating said key update means manually.

3. A communication system according to claim 1, wherein said activation means is also responsive to operation of said direct communication means.

4. A communication system according to claim 1, wherein said direct communication means comprises an optical communication link, and said activation means comprises means for detecting establishment of said optical communication link.

5. A communication system according to claim 1, wherein said direct communication means comprises a cable or wire link connectable between said host device and said portable device, and said activation means comprises means for detecting when said cable or wire link is connected between said host device and said portable device.

6. A communication system according to claim 1, wherein said portable device is provided with a cradle or other support means adjacent or associated with said host device, and said activation means comprises means for detecting when said portable device is in or on or docked with said cradle or other support means.

7. A communication system according to claim 1, wherein said portable device includes a rechargeable battery and said system includes a host device electrical charging means for charging said battery, the host device electrical charging means being adjacent or associated with said system, wherein said activation means comprises means for detecting current flow through said charging means.

8. A communication system according to claim 1, wherein said host device includes means for identifying a request for remote access via said communication medium from a portable device and allowing access only on receipt from the portable device of data authenticating the identity thereof.

9. A communication system according to claim 1, wherein said portable device and said host device include encryption means for encrypting and decrypting data communicated between said devices, and wherein the key for said encryption means comprises said security key.

10. A method of authenticating a remote device in a communication system comprising first and second devices capable of communicating remotely via a communication medium or locally via a local or direct communication link, which method comprises determining whether said first and second devices are in the same vicinity, and initiating sharing of a security key or code data between said devices via said local communication link when said first and second devices are in the same vicinity, whereby the identity of at least one of said devices may be authenticated in subsequent remote communications via said communication medium.

11. A method of encrypting data in a communications system comprising first and second devices capable of communicating remotely via a communication medium or locally via a local or direct communication link, which method comprises determining whether said first and second devices are in the same vicinity, and initiating sharing of a security key or code data between said devices via said local communication link when said first and second devices are in the same vicinity, whereby subsequent remote communications via said communication medium may be encrypted using said security key or code data.

12. A communication system comprising:
   a host device and a portable device for remote communication via a communication medium,
   a direct communication link for providing relatively secure and/or direct communications between said host device and said portable device,
   a key updater for initiating storage of duplicate copies of a fresh security key in both said host device and said portable device, for use instead of said previously-established security key for control of or encryption for subsequent remote communications between said devices, and
   an activator responsive to the presence of said portable device for causing said key updater to initiate sharing of said security key or code data via said direct communication link.

13. A communication system according to claim 12 further including a manual activator for activating said key updater manually.

14. A communication system according to claim 13 wherein said activator is responsive to operation of said direct communication link.

15. A communication system according to claim 12 wherein said direct communication link comprises an optical communication link, and said activator comprises a detector for detecting establishment of said optical communication link.

16. A communication system according to claim 12 wherein said direct communication link comprises a cable or wire link connectable between said host device and said portable device, and said activator comprises a detector for detecting when said cable or wire link is connected between said host device and said portable device.

17. A communication system according to claim 12 wherein said portable device includes a cradle or other support structure adjacent or associated with said host device, and said activator comprises a detector for detecting when said portable device is in or on or docked with said cradle or other support structure.

18. A communication system according to claim 12 wherein said portable device includes a rechargeable battery and said system includes a host device electrical charger for charging said battery, wherein said activator comprises a detector for detecting current flow through said charger.

19. A communication system according to claim 12 wherein said host device includes a detector for identifying a request for remote access via said communication medium from a portable device and allowing access only on receipt from the portable device of said security key or code data or other data authenticating the identity thereof.

20. A communication system according to claim 12 wherein said portable device and said host device include a data encrypter and decrypter responsive to data communicated between said devices, and wherein the key for data encryption and decryption includes said security key or code data.

21. A communication system according to claim 1, wherein the fresh security key contains a number of characters greater than a total number of characters to be sent during said remote communications and before said key update means stores another fresh security key in said host device and said portable device.

* * * * *